United States Patent [19]
Pan et al.

[11] Patent Number: 5,709,568
[45] Date of Patent: Jan. 20, 1998

[54] CONNECTION DEVICE FOR USE WITH MEMORY CARD CONNECTOR APPARATUS

[75] Inventors: Hua-Tsong Pan; May Chen, both of Taipei, Taiwan

[73] Assignee: Hon Hai Precision Ind. Co., Ltd., Taipei, Taiwan

[21] Appl. No.: 503,706

[22] Filed: Jul. 18, 1995

[51] Int. Cl.⁶ .................................................. H01R 23/68
[52] U.S. Cl. .......................................................... 439/541.5
[58] Field of Search ................................ 439/541.5, 79, 439/74, 64, 59, 80

[56] References Cited

U.S. PATENT DOCUMENTS

| | | | |
|---|---|---|---|
| 3,676,746 | 7/1972 | Kassabgi et al. | 439/79 |
| 4,600,256 | 7/1986 | Anttila | 439/79 |
| 4,964,806 | 10/1990 | Sakamoto et al. | 439/80 |
| 5,085,590 | 2/1992 | Galloway | 439/541.5 |
| 5,194,010 | 3/1993 | Dambach et al. | 439/79 |
| 5,305,182 | 4/1994 | Chen | 361/684 |

FOREIGN PATENT DOCUMENTS

| 112184 | 4/1990 | Japan | 439/79 |
|---|---|---|---|

OTHER PUBLICATIONS

IBM Technical Disclosure Bulletin, "Planar I/O Port", vol. 33, No. 8, p. 430, Jan. 1991.

*Primary Examiner*—Gary F. Paumen

[57] ABSTRACT

A memory card connector assembly (32) includes a connection device (40) for use with a memory card connector apparatus (34) for electrically connecting the memory card connector apparatus (34) to a mother board (33) on which such memory card connector apparatus (34) is mounted. The connection device (40) includes a daughter board (42) and a card edge connector (44) wherein the daughter board (42) is vertically positioned on the back side of the memory card connector apparatus (34) for receiving multiple rows of plural spaced contact tails (46) of the memory card connectors (36, 38). The bottom edge region (50) of the daughter board (42) having conductive pads (52) thereon, is adapted to be electrically received within the slot (56) of the card edge connector (44) which is directly electrically mounted onto the mother board (33).

8 Claims, 6 Drawing Sheets

CONNECTION DEVICE FOR USE WITH MEMORY CARD CONNECTOR APPARATUS

BACKGROUND OF THE INVENTION

1. Field of The invention

The invention relates to connection devices for electrically connecting the memory card connectors with the mother board on which the memory card connectors are mounted, and particularly to connection device for use with the stacked type memory card connector apparatus.

2. The Prior Art

The traditional connection methods between a memory card connector apparatus which may include more than one stacked memory card connectors, and a mother board on which the memory card connector apparatus is mounted, includes the following several types. As shown in FIG. 1, the contacts 16 of both the upper memory card connector 12 and the lower memory card connector 14 are directly soldered onto the mother board 11 via a conventional through-hole wave soldering process wherein the tails 18 of the contacts 16 are of a right angle type and aligned for its true positions on the mother board 11 by means of a spacer plate 20.

FIG. 2 shows another prior art method using a pair of socket type connectors 22 and 24 designedly side by side pre-mounted on the mother board 11 for receiving the corresponding ends of the tails 18 of the contacts 16 of the memory card connectors 12 and 14, respectively. Thus, the memory card connectors 12 and 14 may electrical connected to the mother board 11 through such pair of juxtaposed socket type connectors 22 and 24.

FIG. 3 shows a further prior art method using a daughter board 26 horizontally positioned substantially between the upper and the lower memory card connectors 12 and 14 whereby the tails 18 of the contacts 16 of the upper (lower) memory card connectors 12 and 14 are respectively downward (upward) electrically attached to the daughter board 26, and wherein a pair of board-to-board connectors 28 and 30 are respectively mounted to the undersurface of the daughter board 26 and the upper surface of the mother board 11 and mutually connected with each other. Therefore, the signals of the memory card connectors 12 and 14 may be transmitted to the mother board 11 via the daughter board 26 and the board-to-board connectors 28 and 30.

Similar to FIG. 3, FIG. 4 also shows another stacked type memory card connectors 12 and 14 on the mother board 11 with a horizontal daughter board 26 cooperating with a pair of board-to-board connectors 28 and 30 for signal transmission. Unlike the device shown in FIG. 3, the method introduced in FIG. 4 has the daughter board 26 substantially positioned atop the upper memory card connector 12 to which the upper memory card connector 12 is mounted. Hence, the tails of the contacts 16 of the upper memory card connector 12 are directly connected to the daughter board 26 and the tails of the contacts 16 of the lower memory card connector 14 are directly mounted onto the mother board 11, and the signals of the upper memory card connector 12 may be transmitted to the mother board 11 via the daughter board 26 and such pair of board-to-board connectors 28 and 30.

Anyhow, the aforementioned several prior art methods for electrically connecting the stacked type memory card connector apparatus to the mother board, have some shortcomings of either using odd and excessive components such as the spacer plate 20, the daughter board 26, and a pair of board-to-board connectors 28 and 30, or taking too much space on the mother board layout, for achieving such electrical connection. It can be understood that if the right angle type contact tails of the memory card connectors are intended to directly mounted onto the mother board or to be directly inserted into the socket type connector mounted on the mother board, generally it can not help but have the vertical portions of such right angle type contact tails arranged in a staggered or spaced manner. It can be seen that it is impossible to have all the contact tails aligned in a single or narrow line region because the contact itself has its substantial dimension and there should be a minimum value of the pitch in a high density arrangement design. Moreover, because the tails of the contacts of the memory card connectors do extend a substantial distance from the housing of the memory card connectors, it is very difficult to control the positions of the tips of the contact tails which are of a forming type, within a fine pitch range. Based on the foregoing reasons, the tails of the contacts of the memory card connectors, each of which has a horizontal extension, should be arranged in a stagger manner and/or keep a relatively large pitch distance with each other in compliance with the manufacturing tolerance and/or mechanical structural restriction. Unfortunately, if such requirements are directly applied to mother board, it will result in much occupation of the layout on the mother board that substantially conflicts with the current minimization trend in the computer industry.

Therefore, an object of the invention is to provide a connection device for interconnecting the stacked type memory card connector apparatus and the mother board wherein such connection device has less components and is easy to manufactured and assembled to either the stacked type memory card connector apparatus or the mother board, and particularly and more importantly, it saves space on the mother board layout.

SUMMARY OF THE INVENTION

According to an aspect of the invention, a memory card connector assembly includes a connection device for use with a memory card connector apparatus for electrically connecting such memory card connector apparatus to a mother board on which such memory card connector apparatus is mounted. The connection device includes a daughter board and a card edge connector wherein the daughter board is vertically positioned on the back side of the memory card connector apparatus for receiving multiple rows of plural spaced contact tails of the memory card connectors. The bottom edge region of the daughter board having conductive pads thereon, is adapted to be electrically received within the slot of the card edge connector which is directly electrically mounted onto the mother board.

DETAILED DESCRIPTION OF THE PREFERRED EMBODIMENT

References will now be made in detail to the preferred embodiments of the invention. While the present invention has been described with reference to the specific embodiment, the description is illustrative of the invention and is not to be construed as limiting the intention. Various modifications to the present invention can be made to the preferred embodiment by those skilled in the art without departing from the true spirit and scope of the invention as defined by appended claims.

Figure 1:
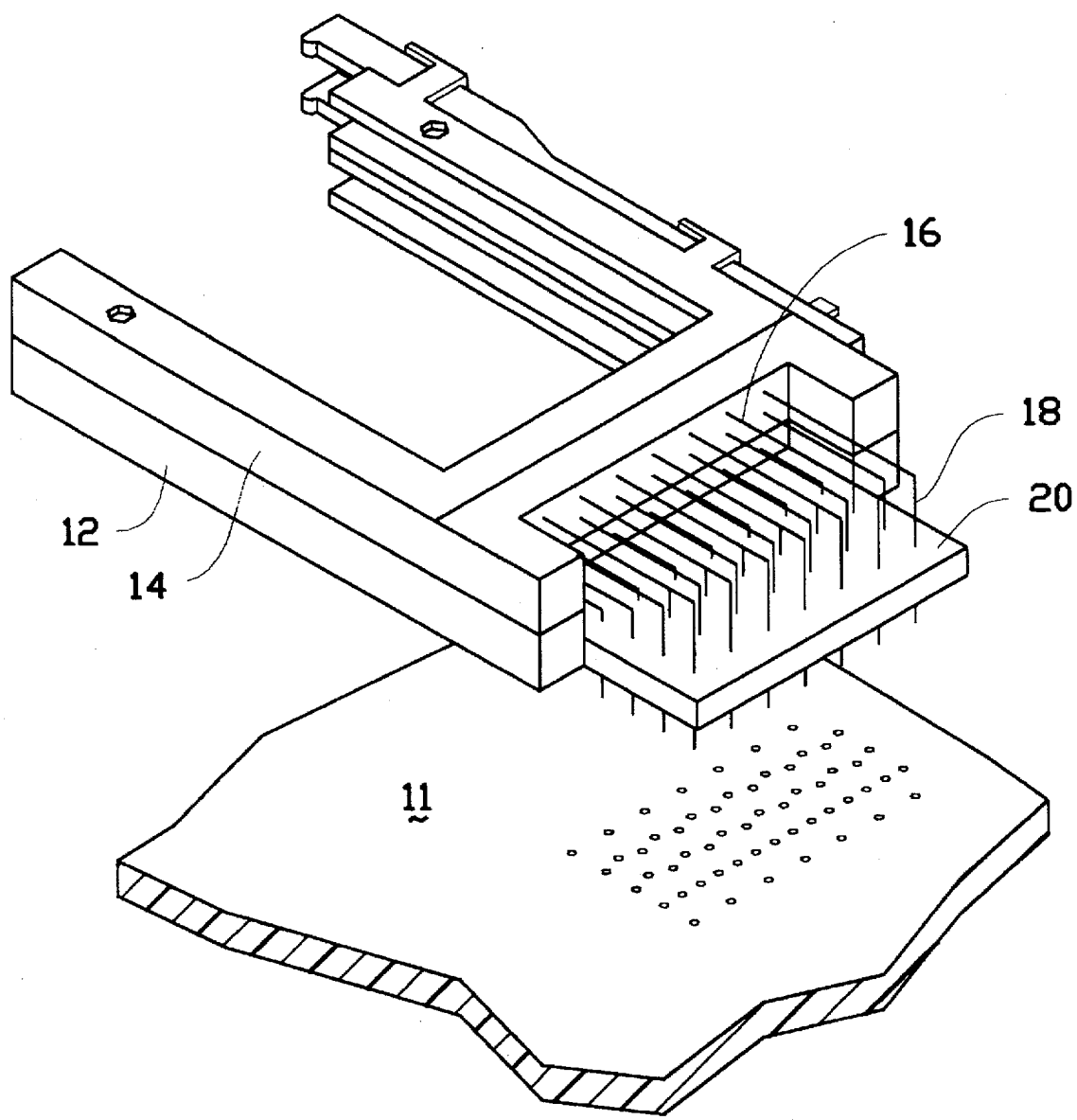
FIG. 1 is a perspective view of the first type connection device for use with memory card connectors on the mother board of the prior art.
Figure 2:
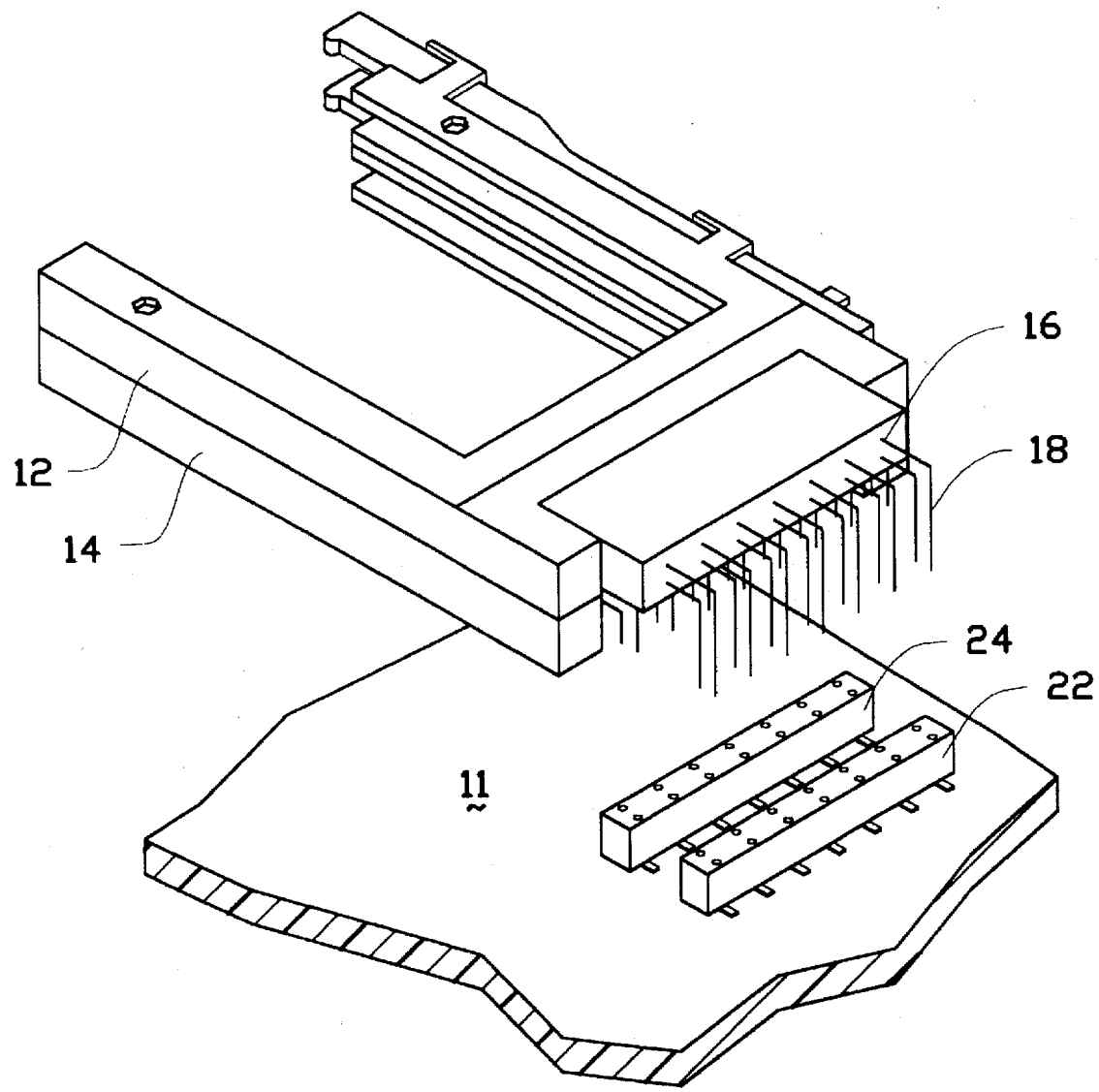
FIG. 2 is a perspective view of the second type connection device for use with memory card connectors on the mother board of the prior art.
Figure 3:
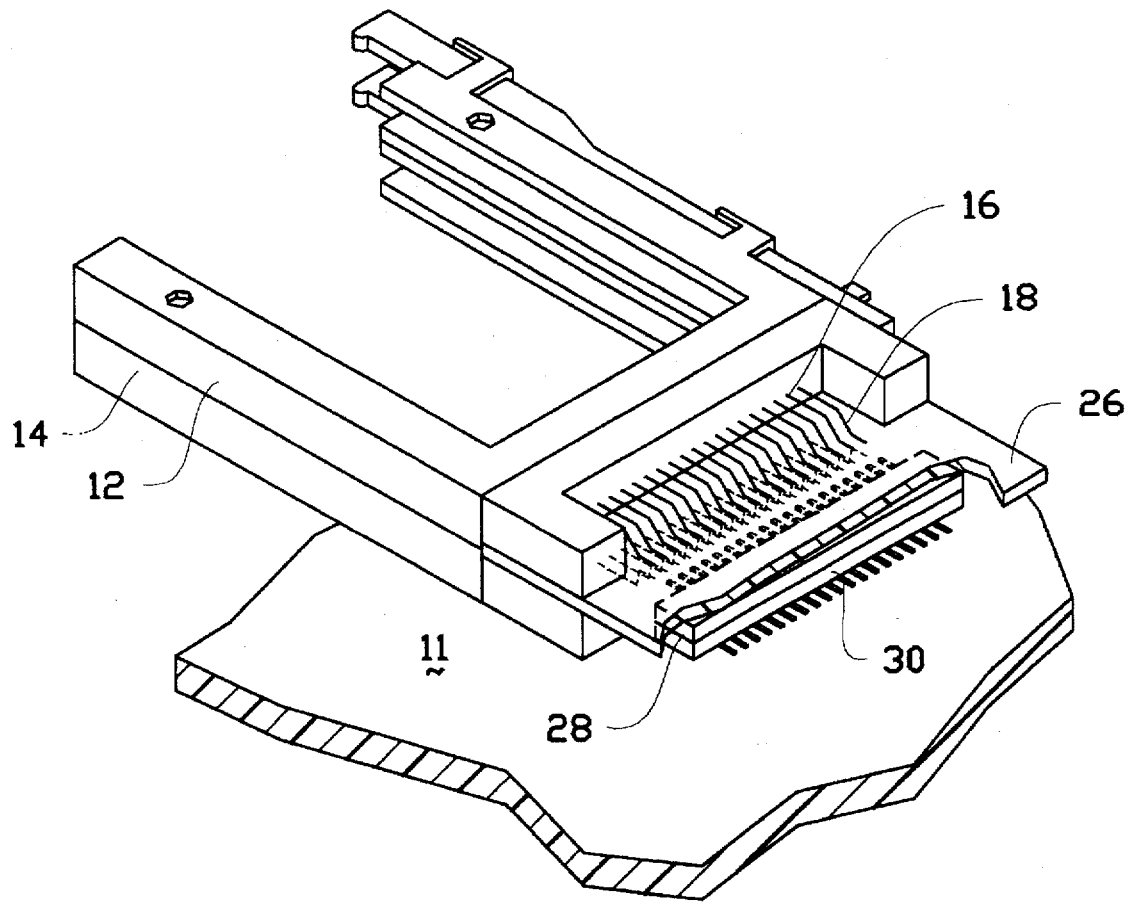
FIG. 3 is a partially cut-away perspective view of the third type connection device for use with memory card connectors on the mother board of the prior art.
Figure 4:
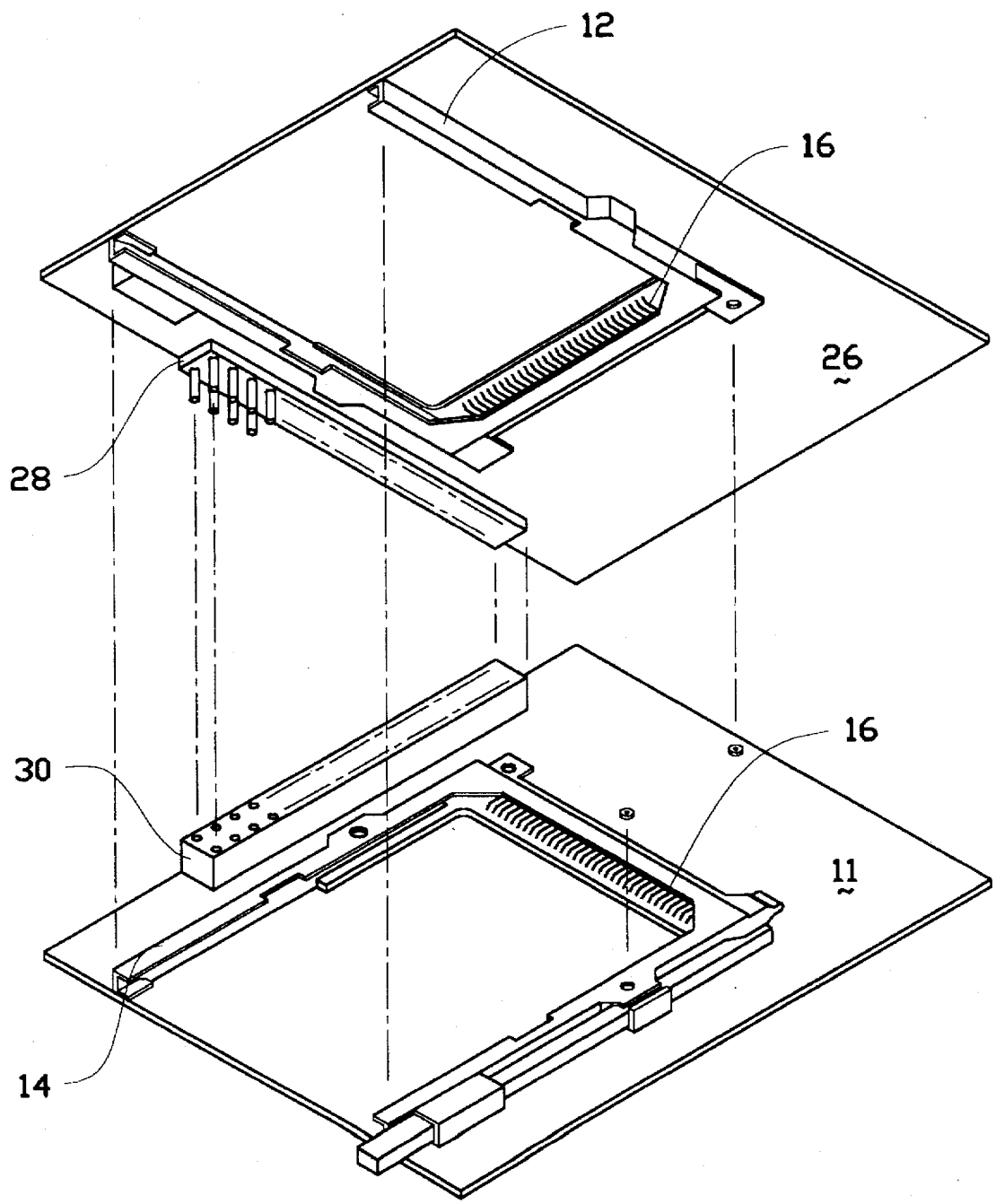
FIG. 4 is a perspective view of the fourth type connection device for use with memory card connectors on the mother board of the prior art.
Figure 5:
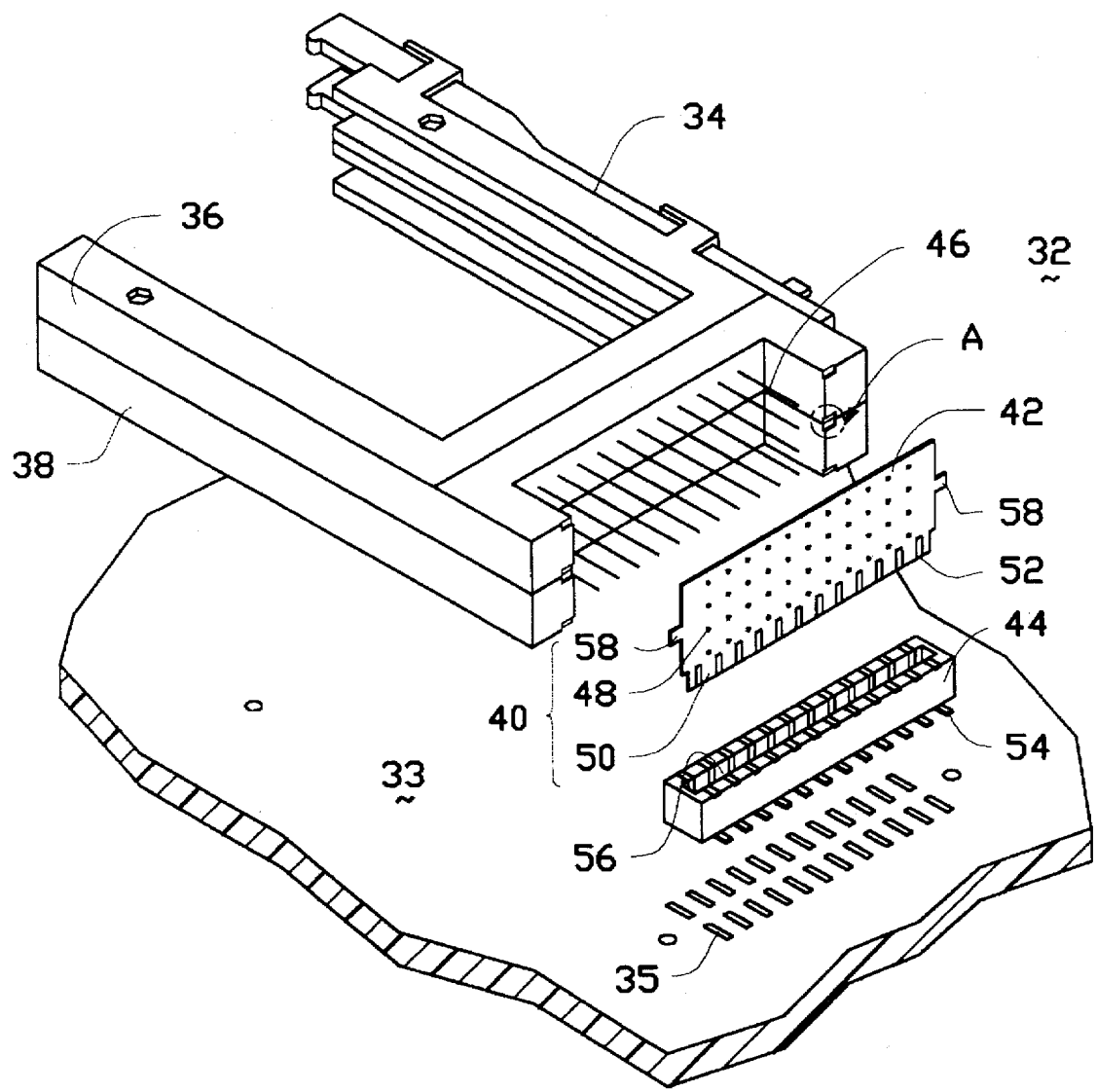
FIG. 5 is a perspective view of a preferred embodiment of a memory card connector assembly having connection device to connecting memory card connector apparatus to a mother board on which the memory card connector apparatus is mounted, according to the present invention.

Referring to FIG. 5, a memory card connector assembly 32 mounted on a mother board 33, includes a memory card apparatus 34 which is comprised of two stacked memory card connectors 36 and 38, and a connection device 40 which is comprised of a daughter board 42 and a card edge connector 44.

The stacked memory card connectors 36 and 38 comprise multiple rows of contacts, the tails 46 of which generally horizontally and mutually parallel extend backward from the rear side of the memory card connectors 36 and 38. The daughter board 42 is vertically positioned on the rear side of the memory card connectors 36 and 38 with multiple rows of properly spaced holes 48 therein corresponding to the tails 46 of the memory card connectors 36 and 38, so that the tips of the tails 46 of the contacts of the memory card connectors 36 and 38 can be electrically fastened to the daughter board 42 via a wave soldering process. The bottom edge region 50 of the daughter board 42 has circuit pads 52 thereon. It can be understood that the circuit pads 52 communicate with the holes 48 through the internal printed circuits of the daughter board 42.

The card edge connector 44 is designedly electrically mounted onto the mother board 33 wherein the tails 54 of the contacts of the card edge connector 44 are soldered on the corresponding circuit pads 35 on the mother board 33 to implement the electrical connection. The card edge connector 44 has a slot 56 for receiving the bottom edge region 50 of the inserted daughter board 42 wherein the contacts of the card edge connector 44 project into the slot 56 and adapted to engage the corresponding pads 52 of the daughter board 42, and whereby the signals from the daughter board 42 may be transmitted to the mother board 33 through the card edge connector 44. In other words, the signals of the memory card connectors 36 and 38 may be transmitted to the mother board 33 via such connection device 40 including the daughter board 42 and the card edge connector 44.

Figure 6:
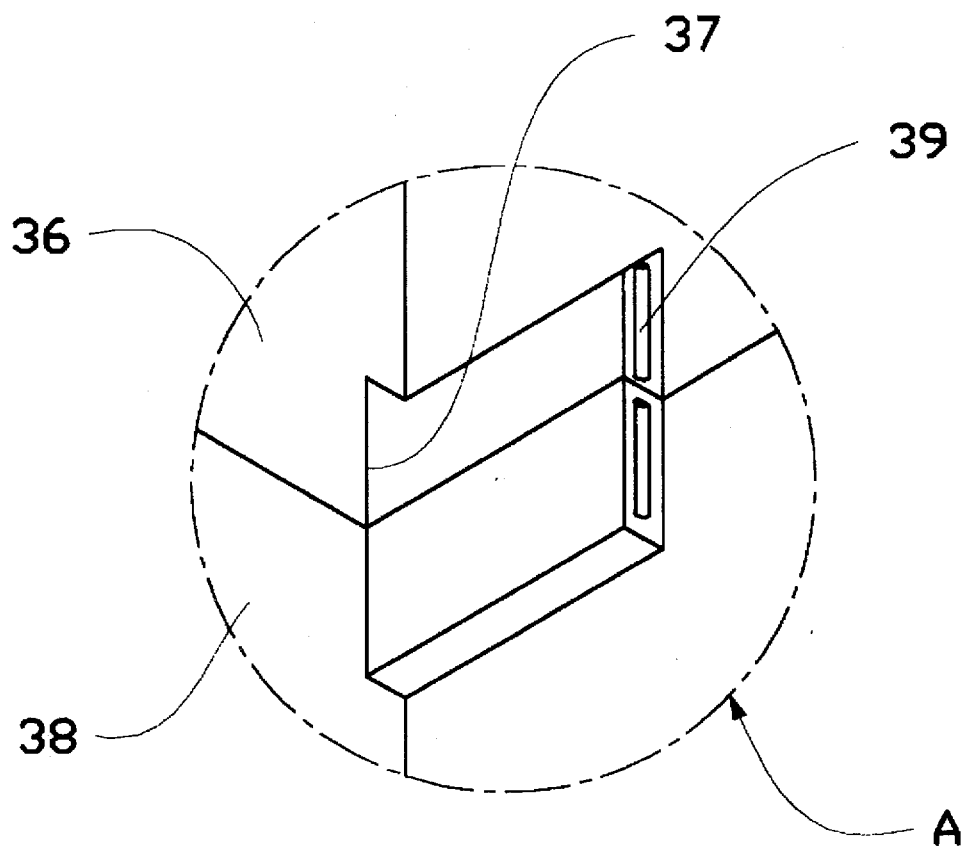
FIG. 6 is an enlarged partially perspective view of a back portion of the memory card connector apparatus to show the recesses therein for receiving the mounting ears of the daughter board for retention purpose.

In this embodiment, referring to Circle A in FIG. 5, and FIG. 6, to reinforce the daughter board 42 with regard to the memory card apparatus 34 for not damaging the contact tails 46 of the memory card connectors 36 and 38 due to relative movement of the daughter board 42 to the memory card apparatus 34, the daughter board 42 may further include a pair mounting ears 58 on its two opposite sides for retainable reception within a pair of corresponding recesses 37 formed in the memory card connector apparatus 34 via embossing ribs 39 pressing thereon. It can be seen that in this embodiment, the memory card connectors 36 and 38 are mechanically fastened to the mother board 33 by means of screws (not shown) extending therethrough and the corresponding holes in the mother board 33.

It can be appreciated that in another alternative embodiment, only the contacts of the upper connector may be designedly mounted to the daughter board, and the contacts of the lower connector may be directly mounted on the mother board if the space consideration of the mother board is not too severe.

It can be noted that the present invention uses a vertical daughter board to absorb the inevitable minimum spacing requirement of the multiple rows of contact tails of the memory card connectors for not occupying excessive layout space on the mother board, and uses less and convenient components to implement this connection between the stacked memory card connectors and the mother board on which such stacked memory card connectors are mounted.

While the present invention has been described with reference to specific embodiment, the description is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are understand that all such equivalent structures are to be included within the scope of the following claims.

What is claimed is:

1. A memory card connector assembly mounted on a mother board, comprising:

a memory card connector apparatus comprising stacked memory card connectors, each having a plurality of contact tails extending backward on its rear side; and a connection device vertically positioned on the rear side of the memory card connector apparatus and comprising a daughter board and a card edge connector, said daughter board electrically connected with some of the contact tails of the memory card connector apparatus and further having circuit pads on a bottom edge region thereof, wherein said card edge connector has a plurality of contacts mechanically and electrically mounted on the mother board and further has a slot facing upward for receiving said bottom edge region of the daughter board, so that some signals may be transmitted between the mother board and the memory card connector apparatus via said connection device.

2. The memory card connector assembly as described in claim 1, wherein the daughter board has at least one mounting ear on one side thereof for retainable reception within at least one corresponding recess on the rear side of the memory card connector apparatus for reinforcement.

3. The memory card connector assembly as described in claim 1, wherein said contact tails of the memory card connectors generally extend horizontally and parallel with each other.

4. The memory card connector assembly as described in claim 3, wherein said daughter board includes a plurality of holes therein corresponding to said contact tails of the memory card connectors for receiving said contact tails therein.

5. A method for connecting an electrical connector apparatus to a mother board, the steps comprising:

a daughter board vertically positioned on a rear side of the electrical connector apparatus wherein contact tails of the connector apparatus generally extend backward horizontally and parallel with each other and are electrically connected to first conductive means on the daughter board, respectively, and wherein said daughter board further includes second conductive means adjacent a bottom edge;

a receiving connector mounted onto the mother board wherein said receiving connector comprises a plurality of contacts;

the electrical connector apparatus with pre-assembled daughter board being mounted onto the mother board under the condition that the second conductive means of the daughter board mechanically and electrically engage the contacts of the receiving connector so that each of contacts of the receiving connector electrically interconnects a corresponding pad on the mother board and a corresponding one of second conductive means of the daughter board for transmission of signals from the electrical connector apparatus through the daughter board and the receiving connector to the mother board; wherein said first conductive means are spaced holes in the daughter board and the second conductive means are circuit pads on a bottom edge region of the daughter board, and said receiving connector is a card edge connector having a slot facing upward for receiving the bottom edge of the daughter board, and the contacts of the receiving connector project into the slot for engagement with the corresponding circuit pads on the daughter board, respectively.

6. A memory card connector assembly adapted to be mounted on a mother board, comprising:

a memory card connector apparatus comprising at least one memory card connector having multiple rows of contact tails, each of said contact tails being aligned with other adjacent contact tails in both horizontal and vertical directions and horizontally extending backward out of a rear side of the memory card connector, and first retention means arranged adjacent the rear side of the memory card connector apparatus; and at least one plate having second retention means arranged along edges of the plate retained within said first retention means of the memory card connector apparatus for secure retention between the memory card connector apparatus and the plate, and the plate electrically connected with some contact tails of the memory card connector apparatus, and further having means formed on a bottom edge region thereof that are not directly soldered on the mother board or to other components on the mother board but are electrically and mechanically received within a connector on the mother board.

7. The memory card connector assembly as described in claim 6, wherein said first retention means has at least one recess on the rear side of the memory card connector apparatus.

8. The memory card connector assembly as described in claim 7, wherein said second retention means has at least one mounting ear on one side of the plate for retainable reception within said corresponding recess of the memory card connector apparatus for reinforcement.

* * * * *